US008630861B2

(12) United States Patent
Chen et al.

(10) Patent No.: US 8,630,861 B2
(45) **Date of Patent: *Jan. 14, 2014**

(54) MIXED LOSSLESS AUDIO COMPRESSION

(75) Inventors: Wei-Ge Chen, Sammamish, WA (US); Chao He, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,611

(22) Filed: Jan. 30, 2012

(65) Prior Publication Data

US 2012/0128162 A1 May 24, 2012

Related U.S. Application Data

(63) Continuation of application No. 12/468,019, filed on May 18, 2009, now Pat. No. 8,108,221, which is a continuation of application No. 10/620,263, filed on Jul. 14, 2003, now Pat. No. 7,536,305.

(60) Provisional application No. 60/408,432, filed on Sep. 4, 2002.

(51) Int. Cl.
*G01L 19/00* (2006.01)

(52) U.S. Cl.
USPC ......... 704/500; 704/219; 341/51; 375/240.23

(58) Field of Classification Search
USPC ................. 704/219, 500; 341/51; 375/240.23
See application file for complete search history.

(56) References Cited

U.S. PATENT DOCUMENTS

| | | | |
|---|---|---|---|
| 5,063,574 | A | 11/1991 | Moose |
| 5,361,278 | A | 11/1994 | Vaupel et al. |
| 5,557,298 | A | 9/1996 | Yang et al. |
| 5,839,100 | A | 11/1998 | Wegener |
| 5,857,000 | A | 1/1999 | Jar-Ferr et al. |
| 5,884,269 | A | 3/1999 | Cellier et al. |

(Continued)

FOREIGN PATENT DOCUMENTS

| | | |
|---|---|---|
| JP | 02-288739 | 11/1990 |
| JP | 05-502983 | 5/1993 |

(Continued)

OTHER PUBLICATIONS

Bosi et al., "ISO/IEC MPEG-2 Advanced Audio Coding," *Journal of the Audio Engineering Society, Audio Engineering Society*, New York, pp. 789-812 (Oct. 1997).

(Continued)

*Primary Examiner* — Daniel D Abebe
(74) *Attorney, Agent, or Firm* — Klarquist Sparkman, LLP

(57) ABSTRACT

A mixed lossless audio compression has application to a unified lossy and lossless audio compression scheme that combines lossy and lossless audio compression within a same audio signal. The mixed lossless compression codes a transition frame between lossy and lossless coding frames to produce seamless transitions. The mixed lossless coding performs a lapped transform and inverse lapped transform to produce an appropriately windowed and folded pseudo-time domain frame, which can then be losslessly coded. The mixed lossless coding also can be applied for frames that exhibit poor lossy compression performance.

18 Claims, 12 Drawing Sheets

(56) References Cited

U.S. PATENT DOCUMENTS

| | | | |
|---|---|---|---|
| 5,914,987 A | 6/1999 | Fogel | |
| 5,926,611 A | 7/1999 | Yang et al. | |
| 6,029,126 A | 2/2000 | Malvar | |
| 6,121,904 A | 9/2000 | Levine | |
| 6,141,446 A | 10/2000 | Boliek et al. | |
| 6,141,645 A | 10/2000 | Chi-Min et al. | |
| 6,219,458 B1 | 4/2001 | Zandi et al. | |
| 6,493,338 B1 | 12/2002 | Preston et al. | |
| 6,624,761 B2 | 9/2003 | Fallon | |
| 6,664,913 B1 | 12/2003 | Craven et al. | |
| 6,675,148 B2 | 1/2004 | Hardwick | |
| 6,757,437 B1 | 6/2004 | Keith et al. | |
| 6,934,677 B2 | 8/2005 | Chen et al. | |
| 7,027,982 B2 | 4/2006 | Chen et al. | |
| 7,076,104 B1 | 7/2006 | Keith et al. | |
| 7,133,832 B2 | 11/2006 | Heo | |
| 7,146,313 B2 | 12/2006 | Chen et al. | |
| 7,190,284 B1 | 3/2007 | Dye et al. | |
| 7,225,136 B2 | 5/2007 | Bruekers | |
| 7,240,001 B2 | 7/2007 | Chen et al. | |
| 7,272,567 B2 | 9/2007 | Fejzo | |
| 7,277,849 B2 | 10/2007 | Streich et al. | |
| 7,424,434 B2 | 9/2008 | Chen et al. | |
| 7,617,110 B2 * | 11/2009 | Kim et al. | 704/501 |
| 2001/0054131 A1 | 12/2001 | Alvarez et al. | |
| 2002/0035470 A1 | 3/2002 | Gao | |
| 2003/0012431 A1 | 1/2003 | Irvine et al. | |
| 2003/0142874 A1 | 7/2003 | Schwartz | |
| 2004/0044534 A1 | 3/2004 | Chen et al. | |
| 2004/0102963 A1 | 5/2004 | Li | |
| 2005/0159940 A1 | 7/2005 | Wu et al. | |
| 2005/0192799 A1 * | 9/2005 | Kim et al. | 704/229 |
| 2007/0016427 A1 | 1/2007 | Thumpudi et al. | |
| 2007/0043575 A1 | 2/2007 | Onuma et al. | |
| 2007/0083362 A1 | 4/2007 | Moriya et al. | |
| 2007/0208557 A1 | 9/2007 | Li et al. | |
| 2008/0234846 A1 * | 9/2008 | Malvar | 700/94 |

FOREIGN PATENT DOCUMENTS

| | | |
|---|---|---|
| JP | 08-095599 | 4/1996 |
| JP | 08-263098 | 10/1996 |
| JP | 09-016199 | 1/1997 |
| JP | 09-044198 | 2/1997 |
| JP | 11-145845 | 5/1999 |
| JP | 11-331852 | 11/1999 |
| JP | 2000-232366 | 8/2000 |
| JP | 2002-041097 | 2/2002 |
| WO | WO 91/05411 | 4/1991 |
| WO | WO01/26095 | 4/2001 |

OTHER PUBLICATIONS

Edler, “Coding of Audio Signals with Overlapping Block Transform and Adaptive Window Functions,” *FREQUENZ, Schiele and Schon GMBH*, Berlin, Germany, pp. 252-256 (Sep. 1989). [also cited as: Edler, “Codierung Von Audiosignalen Mit Uberlappender Transformation Und Adaptiven Fensterfunktionen,”].

European Patent Office Official Communication dated Apr. 11, 2005, 8 pages.

European Patent Office Official Communication dated Aug. 31, 2006, 6 pages.

Golomb, “Run Length Encodings,” *IEEE Transactions on Information Theory*, pp. 399-401 (Jul. 1996).

Hans et al., “Lossless Compression of Digital Audio,” *IEEE Signal Processing Magazine*, vol. 18, No. 4, pp. 21-32 (Jul. 2001).

Kim and Li, “Lossless and lossy image compression using biorthogonal wavelet transforms with multiplierless operations,” IEEE Transactions on Circuits and Systems—II: Analog and Digital Signal Processing 45(8):1113-1118, Aug. 1998.

Kofidis et al., “Wavelet-based medical image compression,” *Future Generations Computer Systems, Elsevier Science Publishers*, vol. 15, No. 2, pp. 223-243 (Mar. 1999).

Li et al., “Perceptually Layered Scalable Codec,” 40th Asilomar Conference on Signals, Systems and Computers, 2006, pp. 2125-2129.

Liebchen et al., “Lossless Transform Coding of Audio Signals,” *Lossless to Transparent Coding IEEE Signal Processing Workshop*, AES Convention, pp. 1-10 (1997).

Moriya et al., “A design of lossy and lossless scalable audio coding,” IEEE International Conference on Acoustics, Speech, and Signal Processing, vol. 2, pp. 889-892, Jun. 5-9, 2000.

Moriya et al., “Sampling rate scalable lossless audio coding,” IEEE Workshop Proceedings, pp. 123-125, Oct. 6-9, 2002.

Sullivan et al., “The H.264/AVC Advanced Video Coding Standard: Overview and Introduction to the Fidelity Range Extensions,” 21 pp. (Aug. 2004).

“Windows Media Audio Codec,” © 2007 Microsoft Corporation, 2 pp.

Yea and Pearlman, “A wavelett-based two-stage near-lossless coder,” IEEE, 2004 International Conference on Image Processing (ICIP), pp. 2503-2506, 2004.

Office Action dated Jan. 22, 2010, for related Japanese Patent Application No. 2003310669, 3 pages (English translation).

Japanese Notice of Rejection from JP2011-079934, English Translation, Feb. 5, 2013, 3 pages.

Japanese Notice of Rejection from JP2011-101828, English Translation, Feb. 5, 2013, 2 pages.

English Translation of Notice of Rejection, Japanese Patent Application No. 2003-310667, dated Dec. 22, 2009, 2 pages.

* cited by examiner

MIXED LOSSLESS AUDIO COMPRESSION

CROSS REFERENCE TO RELATED APPLICATION

This is a continuation of U.S. patent application Ser. No. 12/468,019, filed May 18, 2009, which is a continuation of U.S. patent application Ser. No. 10/620,263, filed Jul. 14, 2003, now issued as U.S. Pat. No. 7,536,305, which in turn claims the benefit of U.S. Provisional Application 60/408,432, filed Sep. 4, 2002, all of which are incorporated herein by reference.

The following U.S. provisional patent applications that were filed concurrently with the above-referenced priority provisional application all relate to the present application: 1) U.S. Provisional Patent Application Ser. No. 60/408,517, entitled, "Architecture And Techniques For Audio Encoding And Decoding," filed Sep. 4, 2002, the disclosure of which is hereby incorporated by reference; and 2) U.S. Provisional Patent Application Ser. No. 60/408,538, entitled, "Entropy Coding by Adapting Coding Between Level and Run Length/Level Modes," filed Sep. 4, 2002, the disclosure of which is hereby incorporated by reference.

TECHNICAL FIELD

The present invention relates to techniques for digitally encoding and processing audio and other signals. The invention more particularly relates to compression techniques combining lossy and lossless encoding of an audio signal.

BACKGROUND

Compression schemes are generally of two kinds, lossy and lossless. Lossy compression compresses an original signal by removing some information from being encoded in the compressed signal, such that the signal upon decoding is no longer identical to the original signal. For example, many modern lossy audio compression schemes use human auditory models to remove signal components that are perceptually undetectable or almost undetectable by human ears. Such lossy compression can achieve very high compression ratios, making lossy compression well suited for applications, such as internet music streaming, downloading, and music playing in portable devices.

On the other hand, lossless compression compresses a signal without loss of information. After decoding, the resulting signal is identical to the original signal. Compared to lossy compression, lossless compression achieves a very limited compression ratio. A 2:1 compression ratio for lossless audio compression usually is considered good. Lossless compression thus is more suitable for applications where perfect reconstruction is required or quality is preferred over size, such as music archiving and DVD audio.

Traditionally, an audio compression scheme is either lossy or lossless. However, there are applications where neither compression type is best suited. For example, practically all modern lossy audio compression schemes use a frequency domain method and a psychoacoustic model for noise allocation. Although the psychoacoustic model works well for most signals and most people, it is not perfect. First, some users may wish to have the ability to choose higher quality levels during portions of an audio track where degradation due to lossy compression is most perceptible. This is especially important when there is no good psychoacoustic model that can appeal to their ears. Secondly, some portions of the audio data may defy any good psychoacoustic model, so that the lossy compression uses a lot of bits—even data "expansion" in order to achieve the desired quality. In this case, lossless coding may be more efficient.

SUMMARY

Audio processing with unified lossy and lossless audio compression described herein permits use of lossy and lossless compression in a unified manner on a single audio signal. With this unified approach, the audio encoder can switch from encoding the audio signal using lossy compression to achieve a high compression ratio on portions of the audio signal where the noise allocation by the psychoacoustic model is acceptable, to use of lossless compression on those portions where higher quality is desired and/or lossy compression fails to achieve sufficiently high compression.

One significant obstacle to unifying lossy and lossless compression in a single compression stream is that the transition between lossy and lossless compression can introduce audible discontinuities in the decoded audio signal. More specifically, due to the removal of certain audio components in a lossy compression portion, the reconstructed audio signal for a lossy compression portion may be significantly discontinuous with an adjacent lossless compression portion at the boundary between these portions, which can introduce audible noise ("popping") when switching between lossy and lossless compression.

A further obstacle is that many lossy compression schemes process the original audio signal samples on an overlapped window basis, whereas lossless compression schemes generally do not. If the overlapped portion is dropped in switching from the lossy to lossless compression, the transition discontinuity can be exacerbated. On the other hand, redundantly coding the overlapped portion with both lossy and lossless compression may reduce the achieved compression ratio.

An embodiment of unified lossy and lossless compression illustrated herein addresses these obstacles. In this embodiment, the audio signal is divided into frames, which can be encoded as three types: (1) lossy frames encoded using lossy compression, (2) lossless frames encoded using lossless compression, and (3) mixed lossless frames that serve as transition frames between the lossy and lossless frames. The mixed lossless frame also can be used for isolated frames among lossy frames where lossy compression performance is poor, without serving to transition between lossy and lossless frames.

The mixed lossless frames are compressed by performing a lapped transform on an overlapping window as in the lossy compression case, followed by its inverse transform to produce a single audio signal frame, which is then losslessly compressed. The audio signal frame resulting after the lapped transform and inverse transform is herein termed a "pseudo-time domain signal," since it is no longer in the frequency domain and also is not the original time domain version of the audio signal. This processing has the characteristic of seamlessly blending from lossy frames using the frequency domain methods like lapped transform to lossless frames using time domain signal processing methods like linear prediction coding directly, and vice-versa.

Additional features and advantages of the invention will be made apparent from the following detailed description of embodiments that proceeds with reference to the accompanying drawings.

DETAILED DESCRIPTION

The following description is directed to an audio processor and audio processing techniques for unified lossy and lossless audio compression. An exemplary application of the audio processor and processing techniques is in an audio encoder and decoder, such as an encoder and decoder employing a variation of the Microsoft Windows Media Audio (WMA) File format. However, the audio processor and processing techniques are not limited to this format, and can be applied to other audio coding formats. Accordingly, the audio processor and processing techniques are described in the context of a generalized audio encoder and decoder, but alternatively can be incorporated in various types of audio encoders and decoders.

I. Generalized Audio Encoder and Decoder

Figure 1:
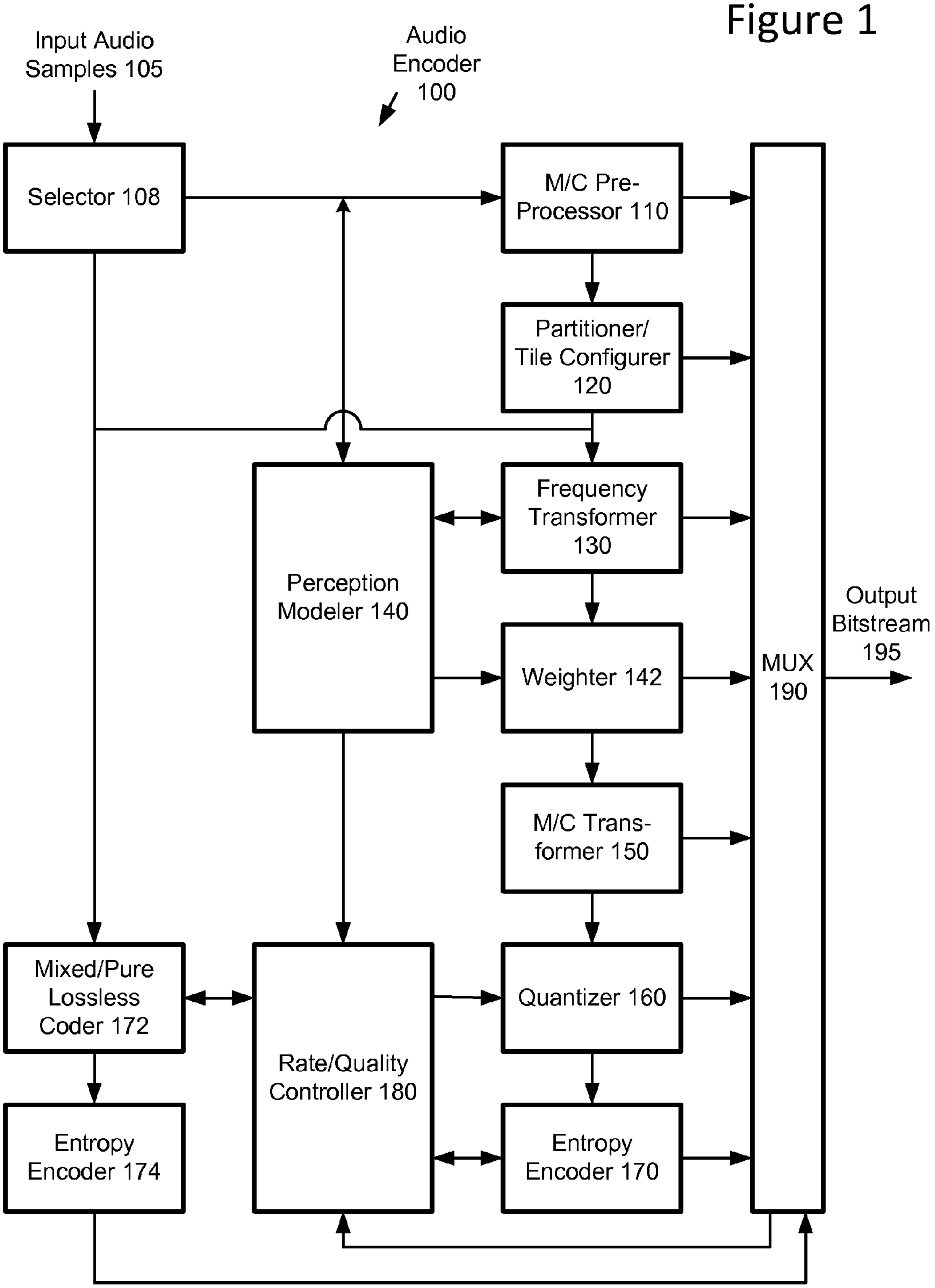
FIG. 1 is a block diagram of an audio encoder in which described embodiments may be implemented.
Figure 2:
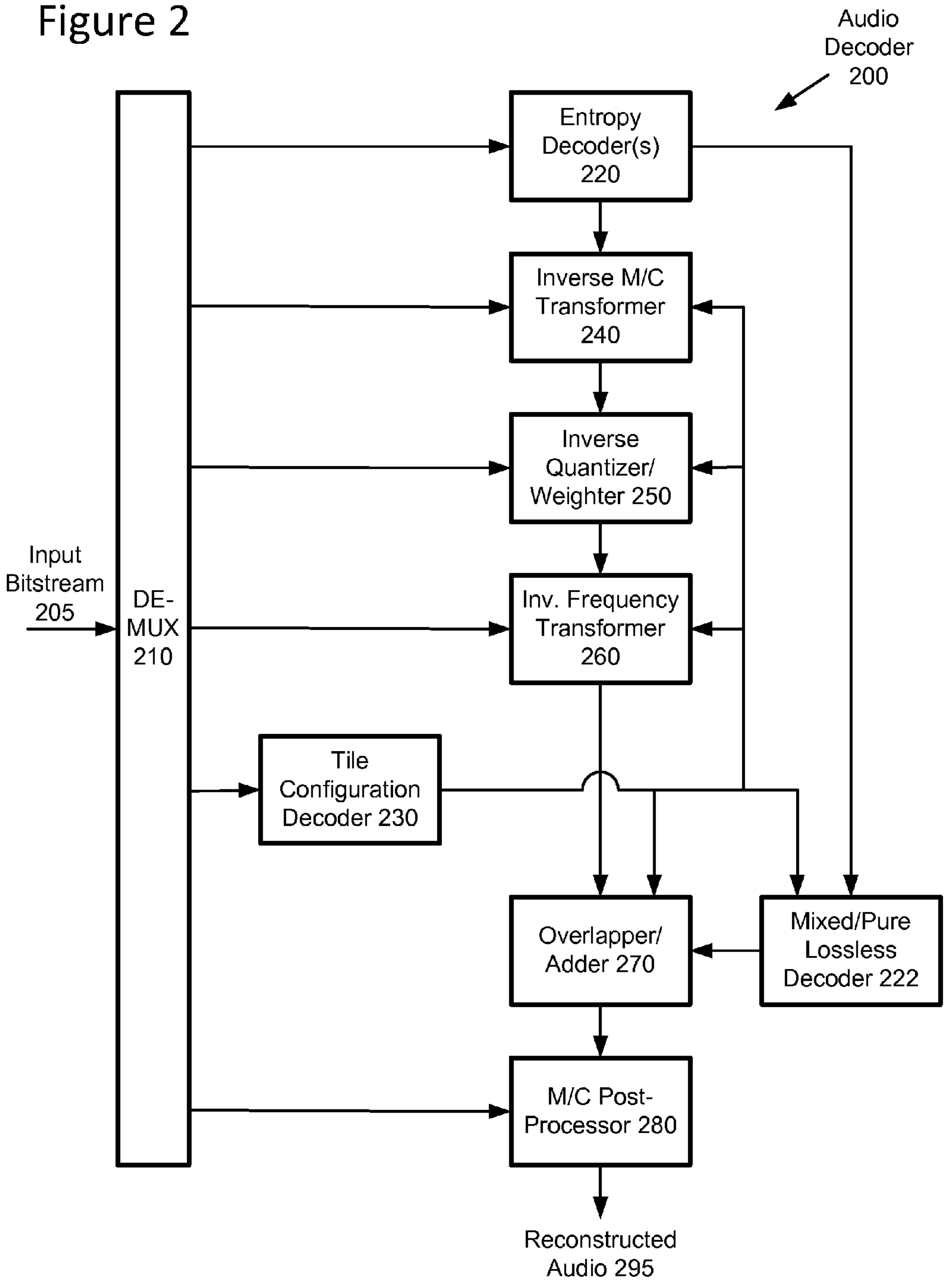
FIG. 2 is a block diagram of an audio decoder in which described embodiments may be implemented.

FIG. 1 is a block diagram of a generalized audio encoder (100) in which audio processing for unified lossy and lossless audio compression may be implemented. The encoder (100) processes multi-channel audio data during encoding. FIG. 2 is a block diagram of a generalized audio decoder (200) in which described embodiments may be implemented. The decoder (200) processes multi-channel audio data during decoding.

The relationships shown between modules within the encoder and decoder indicate the main flow of information in the encoder and decoder; other relationships are not shown for the sake of simplicity. Depending on implementation and the type of compression desired, modules of the encoder or decoder can be added, omitted, split into multiple modules, combined with other modules, and/or replaced with like modules. In alternative embodiments, encoders or decoders with different modules and/or other configurations process multi-channel audio data.

A. Generalized Audio Encoder

The generalized audio encoder (100) includes a selector (108), a multi-channel pre-processor (110), a partitioner/tile configurer (120), a frequency transformer (130), a perception modeler (140), a weighter (142), a multi-channel transformer (150), a quantizer (160), an entropy encoder (170), a controller (180), a mixed/pure lossless coder (172) and associated entropy encoder (174), and a bit stream multiplexer ["MUX"] (190).

The encoder (100) receives a time series of input audio samples (105) at some sampling depth and rate in pulse code modulated ["PCM"] format. For most of the described embodiments, the input audio samples (105) are for multi-channel audio (e.g., stereo mode, surround), but the input audio samples (105) can instead be mono. The encoder (100) compresses the audio samples (105) and multiplexes information produced by the various modules of the encoder (100) to output a bit stream (195) in a format such as Windows Media Audio ["WMA"] or Advanced Streaming Format ["ASF"]. Alternatively, the encoder (100) works with other input and/or output formats.

Initially, the selector (108) selects between multiple encoding modes for the audio samples (105). In FIG. 1, the selector (108) switches between two modes: a mixed/pure lossless coding mode and a lossy coding mode. The lossless coding mode includes the mixed/pure lossless coder (172) and is typically used for high quality (and high bit rate) compression. The lossy coding mode includes components such as the weighter (142) and quantizer (160) and is typically used for adjustable quality (and controlled bit rate) compression. The selection decision at the selector (108) depends upon user input (e.g., a user selecting lossless encoding for making high quality audio copies) or other criteria. In other circumstances (e.g., when lossy compression fails to deliver adequate performance), the encoder (100) may switch from lossy coding over to mixed/pure lossless coding for a frame or set of frames.

For lossy coding of multi-channel audio data, the multi-channel pre-processor (110) optionally re-matrixes the time-domain audio samples (105). In some embodiments, the multi-channel pre-processor (110) selectively re-matrixes the audio samples (105) to drop one or more coded channels or increase inter-channel correlation in the encoder (100), yet allow reconstruction (in some form) in the decoder (200). This gives the encoder additional control over quality at the channel level. The multi-channel pre-processor (110) may send side information such as instructions for multi-channel post-processing to the MUX (190). For additional detail about the operation of the multi-channel pre-processor in some embodiments, see the section entitled "Multi-Channel Pre-Processing" in the related application entitled, "Architecture And Techniques For Audio Encoding And Decoding." Alternatively, the encoder (100) performs another form of multi-channel pre-processing.

The partitioner/tile configurer (120) partitions a frame of audio input samples (105) into sub-frame blocks with time-varying size and window shaping functions. The sizes and windows for the sub-frame blocks depend upon detection of transient signals in the frame, coding mode, as well as other factors.

If the encoder (100) switches from lossy coding to mixed/pure lossless coding, sub-frame blocks need not overlap or have a windowing function in theory, but transitions between lossy coded frames and other frames may require special treatment. The partitioner/tile configurer (120) outputs blocks of partitioned data to the mixed/pure lossless coder (172) and outputs side information such as block sizes to the MUX (190). Additional detail about partitioning and windowing for mixed or pure losslessly coded frames are presented in following sections of the description.

When the encoder (100) uses lossy coding, possible sub-frame sizes include 32, 64, 128, 256, 512, 1024, 2048, and 4096 samples. The variable size allows variable temporal resolution. Small blocks allow for greater preservation of time detail at short but active transition segments in the input audio samples (105), but sacrifice some frequency resolution. In contrast, large blocks have better frequency resolution and worse time resolution, and usually allow for greater compression efficiency at longer and less active segments, in part because frame header and side information is proportionally less than in small blocks. Blocks can overlap to reduce perceptible discontinuities between blocks that could otherwise be introduced by later quantization. The partitioner/tile configurer (120) outputs blocks of partitioned data to the frequency transformer (130) and outputs side information such as block sizes to the MUX (190). For additional information about transient detection and partitioning criteria in some embodiments, see U.S. patent application Ser. No. 10/016,918, entitled "Adaptive Window-Size Selection in Transform Coding," filed Dec. 14, 2001, hereby incorporated by reference. Alternatively, the partitioner/tile configurer (120) uses other partitioning criteria or block sizes when partitioning a frame into windows.

In some embodiments, the partitioner/tile configurer (120) partitions frames of multi-channel audio on a per-channel basis. In contrast to previous encoders, the partitioner/tile configurer (120) need not partition every different channel of the multi-channel audio in the same manner for a frame. Rather, the partitioner/tile configurer (120) independently partitions each channel in the frame. This allows, for example, the partitioner/tile configurer (120) to isolate transients that appear in a particular channel of multi-channel data with smaller windows, but use larger windows for frequency resolution or compression efficiency in other channels in the frame. While independently windowing different channels of multi-channel audio can improve compression efficiency by isolating transients on a per channel basis, additional information specifying the partitions in individual channels is needed in many cases. Moreover, windows of the same size that are co-located in time may qualify for further redundancy reduction. Thus, the partitioner/tile configurer (120), groups windows of the same size that are co-located in time as a tile. For additional detail about tiling in some embodiments, see the section entitled "Tile Configuration" in the related application entitled, "Architecture And Techniques For Audio Encoding And Decoding."

The frequency transformer (130) receives the audio samples (105) and converts them into data in the frequency domain. The frequency transformer (130) outputs blocks of frequency coefficient data to the weighter (142) and outputs side information such as block sizes to the MUX (190). The frequency transformer (130) outputs both the frequency coefficients and the side information to the perception modeler (140). In some embodiments, the frequency transformer (130) applies a time-varying MLT to the sub-frame blocks, which operates like a DCT modulated by the window function(s) of the sub-frame blocks. Alternative embodiments use other varieties of MLT, or a DCT, FFT, or other type of modulated or non-modulated, overlapped or non-overlapped frequency transform, or use sub band or wavelet coding.

The perception modeler (140) models properties of the human auditory system to improve the perceived quality of the reconstructed audio signal for a given bit rate. Generally, the perception modeler (140) processes the audio data according to an auditory model, then provides information to the weighter (142) which can be used to generate weighting factors for the audio data. The perception modeler (140) uses any of various auditory models and passes excitation pattern information or other information to the weighter (142).

The weighter (142) generates weighting factors for a quantization matrix based upon the information received from the perception modeler (140) and applies the weighting factors to the data received from the frequency transformer (130). The weighting factors include a weight for each of multiple quantization bands in the audio data. The quantization bands can be the same or different in number or position from the critical bands used elsewhere in the encoder (100). The weighting factors indicate proportions at which noise is spread across the quantization bands, with the goal of minimizing the audibility of the noise by putting more noise in bands where it is less audible, and vice versa. The weighting factors can vary in amplitudes and number of quantization bands from block to block. The weighter (140) outputs weighted blocks of coefficient data to the multi-channel transformer (150) and outputs side information such as the set of weighting factors to the MUX (190). The weighter (140) can also output the weighting factors to other modules in the encoder (100). The set of weighting factors can be compressed for more efficient representation. If the weighting factors are lossy compressed, the reconstructed weighting factors are typically used to weight the blocks of coefficient data. For additional detail about computation and compression of weighting factors in some embodiments, see the section entitled "Inverse Quantization and Inverse Weighting" in the related application entitled, "Architecture And Techniques For Audio Encoding And Decoding." Alternatively, the encoder (100) uses another form of weighting or skips weighting.

For multi-channel audio data, the multiple channels of noise-shaped frequency coefficient data produced by the weighter (142) often correlate. To exploit this correlation, the multi-channel transformer (150) can apply a multi-channel transform to the audio data of a tile. In some implementations, the multi-channel transformer (150) selectively and flexibly applies the multi-channel transform to some but not all of the channels and/or critical bands in the tile. This gives the multi-channel transformer (150) more precise control over application of the transform to relatively correlated parts of the tile. To reduce computational complexity, the multi-channel transformer (150) use a hierarchical transform rather than a one-level transform. To reduce the bit rate associated with the transform matrix, the multi-channel transformer (150) selectively uses pre-defined (e.g., identity/no transform, Hadamard, DCT Type II) matrices or custom matrices, and applies efficient compression to the custom matrices. Finally, since the multi-channel transform is downstream from the weighter (142), the perceptibility of noise (e.g., due to subsequent quantization) that leaks between channels after the inverse multi-channel transform in the decoder (200) is controlled by inverse weighting. For additional detail about multi-channel transforms in some embodiments, see the section entitled "Flexible Multi-Channel Transforms" in the related application entitled, "Architecture And Techniques For Audio Encoding And Decoding." Alternatively, the encoder (100) uses other forms of multi-channel transforms or no transforms at all. The multi-channel transformer (150) produces side information to the MUX (190) indicating, for example, the multi-channel transforms used and multi-channel transformed parts of tiles.

The quantizer (160) quantizes the output of the multi-channel transformer (150), producing quantized coefficient data to the entropy encoder (170) and side information including quantization step sizes to the MUX (190). Quantization introduces irreversible loss of information, but also allows the encoder (100) to regulate the quality and bit rate of the output bit stream (195) in conjunction with the controller (180). The quantizer can be an adaptive, uniform, scalar quantizer that computes a quantization factor per tile and can also compute per-channel quantization step modifiers per channel in a given tile. The tile quantization factor can change from one iteration of a quantization loop to the next to affect the bit rate of the entropy encoder (160) output, and the per-channel quantization step modifiers can be used to balance reconstruction quality between channels. In alternative embodiments, the quantizer is a non-uniform quantizer, a vector quantizer, and/or a non-adaptive quantizer, or uses a different form of adaptive, uniform, scalar quantization.

The entropy encoder (170) losslessly compresses quantized coefficient data received from the quantizer (160). In some embodiments, the entropy encoder (170) uses adaptive entropy encoding as described in the related application entitled, "Entropy Coding by Adapting Coding Between Level and Run Length/Level Modes." Alternatively, the entropy encoder (170) uses some other form or combination of multi-level run length coding, variable-to-variable length coding, run length coding, Huffman coding, dictionary coding, arithmetic coding, LZ coding, or some other entropy encoding technique. The entropy encoder (170) can compute the number of bits spent encoding audio information and pass this information to the rate/quality controller (180).

The controller (180) works with the quantizer (160) to regulate the bit rate and/or quality of the output of the encoder (100). The controller (180) receives information from other modules of the encoder (100) and processes the received information to determine desired quantization factors given current conditions. The controller (170) outputs the quantization factors to the quantizer (160) with the goal of satisfying quality and/or bit rate constraints. The controller (180) can include an inverse quantizer, an inverse weighter, an inverse multi-channel transformer, and potentially other modules to reconstruct the audio data or compute information about the block.

The mixed lossless/pure lossless encoder (172) and associated entropy encoder (174) compress audio data for the mixed/pure lossless coding mode. The encoder (100) uses the mixed/pure lossless coding mode for an entire sequence or switches between coding modes on a frame-by-frame or other basis. In general, the lossless coding mode results in higher quality, higher bit rate output than the lossy coding mode. Alternatively, the encoder (100) uses other techniques for mixed or pure lossless encoding.

The MUX (190) multiplexes the side information received from the other modules of the audio encoder (100) along with the entropy encoded data received from the entropy encoder (170). The MUX (190) outputs the information in WMA format or another format that an audio decoder recognizes. The MUX (190) includes a virtual buffer that stores the bit stream (195) to be output by the encoder (100). The virtual buffer stores a pre-determined duration of audio information (e.g., 5 seconds for streaming audio) in order to smooth over short-term fluctuations in bit rate due to complexity changes in the audio. The virtual buffer then outputs data at a relatively constant bit rate. The current fullness of the buffer, the rate of change of fullness of the buffer, and other characteristics of the buffer can be used by the controller (180) to regulate quality and/or bit rate.

B. Generalized Audio Decoder

With reference to FIG. 2, the generalized audio decoder (200) includes a bit stream demultiplexer ["DEMUX"] (210), one or more entropy decoders (220), a mixed/pure lossless decoder (222), a tile configuration decoder (230), an inverse multi-channel transformer (240), a inverse quantizer/weighter (250), an inverse frequency transformer (260), an overlapper/adder (270), and a multi-channel post-processor (280). The decoder (200) is somewhat simpler than the encoder (200) because the decoder (200) does not include modules for rate/quality control or perception modeling.

The decoder (200) receives a bit stream (205) of compressed audio information in WMA format or another format. The bit stream (205) includes entropy encoded data as well as side information from which the decoder (200) reconstructs audio samples (295).

The DEMUX (210) parses information in the bit stream (205) and sends information to the modules of the decoder (200). The DEMUX (210) includes one or more buffers to compensate for short-term variations in bit rate due to fluctuations in complexity of the audio, network jitter, and/or other factors.

The one or more entropy decoders (220) losslessly decompress entropy codes received from the DEMUX (210). The entropy decoder(s) (220) typically applies the inverse of the entropy encoding technique used in the encoder (100). For the sake of simplicity, one entropy decoder module is shown in FIG. 2, although different entropy decoders may be used for lossy and lossless coding modes, or even within modes. Also, for the sake of simplicity, FIG. 2 does not show mode selection logic. When decoding data compressed in lossy coding mode, the entropy decoder (220) produces quantized frequency coefficient data.

The mixed/pure lossless decoder (222) and associated entropy decoder(s) (220) decompress losslessly encoded audio data for the mixed/pure lossless coding mode. The decoder (200) uses a particular decoding mode for an entire sequence, or switches decoding modes on a frame-by-frame or other basis.

The tile configuration decoder (230) receives information indicating the patterns of tiles for frames from the DEMUX (290). The tile pattern information may be entropy encoded or otherwise parameterized. The tile configuration decoder (230) then passes tile pattern information to various other components of the decoder (200). For additional detail about tile configuration decoding in some embodiments, see the section entitled "Tile Configuration" in the related application entitled, "Architecture And Techniques For Audio Encoding And Decoding." Alternatively, the decoder (200) uses other techniques to parameterize window patterns in frames.

The inverse multi-channel transformer (240) receives the entropy decoded quantized frequency coefficient data from the entropy decoder(s) (220) as well as tile pattern information from the tile configuration decoder (230) and side information from the DEMUX (210) indicating, for example, the multi-channel transform used and transformed parts of tiles. Using this information, the inverse multi-channel transformer (240) decompresses the transform matrix as necessary, and selectively and flexibly applies one or more inverse multi-channel transforms to the audio data of a tile. The placement of the inverse multi-channel transformer (240) relative to the inverse quantizer/weighter (240) helps shape quantization noise that may leak across channels due to the quantization of multi-channel transformed data in the encoder (100). For additional detail about inverse multi-channel transforms in some embodiments, see the section entitled "Flexible Multi-Channel Transforms" in the related application entitled, "Architecture And Techniques For Audio Encoding And Decoding."

The inverse quantizer/weighter (250) receives tile and channel quantization factors as well as quantization matrices from the DEMUX (210) and receives quantized frequency coefficient data from the inverse multi-channel transformer (240). The inverse quantizer/weighter (250) decompresses the received quantization factor/matrix information as necessary, then performs the inverse quantization and weighting. For additional detail about inverse quantization and weighting in some embodiments, see the section entitled "Inverse Quantization and Inverse Weighting" in the related application entitled, "Architecture And Techniques For Audio Encoding And Decoding." In alternative embodiments, the inverse quantizer applies the inverse of some other quantization techniques used in the encoder.

The inverse frequency transformer (260) receives the frequency coefficient data output by the inverse quantizer/weighter (250) as well as side information from the DEMUX (210) and tile pattern information from the tile configuration decoder (230). The inverse frequency transformer (270) applies the inverse of the frequency transform used in the encoder and outputs blocks to the overlapper/adder (270).

The overlapper/adder (270) generally corresponds to the partitioner/tile configurer (120) in the encoder (100). In addition to receiving tile pattern information from the tile configuration decoder (230), the overlapper/adder (270 receives decoded information from the inverse frequency transformer (260) and/or mixed/pure lossless decoder (222). In some embodiments, information received from the inverse frequency transformer (260) and some information from the mixed/pure lossless decoder (222) is pseudo-time domain information—it is generally organized by time, but has been windowed and derived from overlapping blocks. Other information received from the mixed/pure lossless decoder (222) (e.g., information encoded with pure lossless coding) is time domain information. The overlapper/adder (270) overlaps and adds audio data as necessary and interleaves frames or other sequences of audio data encoded with different modes. Additional detail about overlapping, adding, and interleaving mixed or pure losslessly coded frames are described in following sections. Alternatively, the decoder (200) uses other techniques for overlapping, adding, and interleaving frames.

The multi-channel post-processor (280) optionally re-matrixes the time-domain audio samples output by the overlapper/adder (270). The multi-channel post-processor selectively re-matrixes audio data to create phantom channels for playback, perform special effects such as spatial rotation of channels among speakers, fold down channels for playback on fewer speakers, or for any other purpose. For bit stream-controlled post-processing, the post-processing transform matrices vary over time and are signaled or included in the bit stream (205). For additional detail about the operation of the multi-channel post-processor in some embodiments, see the section entitled "Multi-Channel Post-Processing" in the related application entitled, "Architecture And Techniques For Audio Encoding And Decoding." Alternatively, the decoder (200) performs another form of multi-channel post-processing.

II. Unified Lossy and Lossless Audio Compression

An embodiment of unified lossy and lossless compression incorporated into the above described generalized audio encoder 100 (FIG. 1) and decoder 200 (FIG. 2) selectively encodes parts of the input audio signal with lossy compression (e.g., using frequency transform-based coding with quantization based on a perceptual model at components 130, 140, 160), and encodes other parts using lossless compression (e.g., in mixed/pure lossless coder 172). This approach unifies lossless compression to achieve higher quality of audio where high quality is desired (or where lossy compression fails to achieve a high compression ratio for the desired quality), together with lossy compression where appropriate for high compression without perceptible loss of quality. This also allows coding audio with different quality levels within a single audio signal.

This unified lossy and lossless compression embodiment further achieves seamless switching between lossy and lossless compression, and also transitions between coding in which input audio is processed in overlapped windows and non-overlapped processing. For seamless switching, this unified lossy and lossless compression embodiment processes the input audio selectively broken into three types of audio frames: lossy frames (LSF) 300-304 (FIG. 3) encoded with lossy compression, pure lossless frames (PLLF) 310-312 encoded with lossless compression, and mixed lossless frames (MLLF) 320-322. The mixed lossless frames 321-322 serve as the transition between the lossy frames 302-303 and pure lossless frames 310-312. The mixed lossless frame 320 also can be an isolated frame among the lossy frames 300-301 in which lossy compression performance would be poor, without serving a transitional purpose. The following Table 1 summarizes the three audio frame types in the unified lossy and lossless compression embodiment.

TABLE 1

Frame Types for Unified Lossy and Lossless Compression

| | Codec Algorithm | Recon. Noise | Purpose |
|---|---|---|---|
| Lossy Frame (LSF) | Perceptual audio compression with psychoacoustic model | Unlimited | Low bit rate (high compression ratio) |
| Pure Lossless Frame (PLLF) | Cascaded adaptive LMS | 0 | Perfect reconstruction or super high quality |
| Mixed Lossless Frame (MLLF) | Fixed Block-wise LPC | Limited (Only from windowing process). | 1) Transition frame 2) when lossy codec performs badly |

Figure 3:
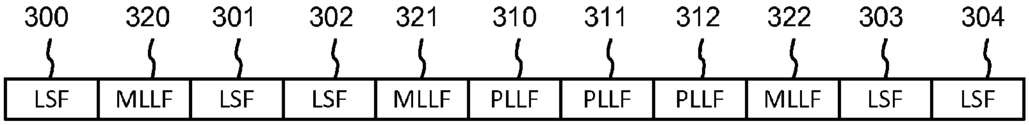
FIG. 3 is an illustration of a compressed audio signal encoded using one embodiment of unified lossy and lossless compression, and composed of lossy, mixed lossless and pure lossless frames.

With reference to the frame structure in one example of an audio signal encoded using unified lossy and lossless compression shown in FIG. 3, the audio signal in this example is encoded as a sequence of blocks, each block being a windowed frame. The mixed lossless frames usually are isolated among lossy frames, as is the mixed lossless frame 320 in this example. This is because the mixed lossless frames are enabled for "problematic" frames, for which lossy compression has poor compression performance. Typically, these are very noisy frames of the audio signal and have isolated occurrence within the audio signal. The pure lossless frames are usually consecutive. The starting and ending positions of the pure lossless frames within the audio signal can be determined for example by the user of the encoder (e.g., by selecting a portion of the audio signal to be encoded with very high quality). Alternatively, the decision to use pure lossless frames for a portion of the audio signal can be automated. However, the unified lossy and lossless compression embodiment can encode an audio signal using all lossy, mixed lossless or pure lossless frames.

Figure 4:
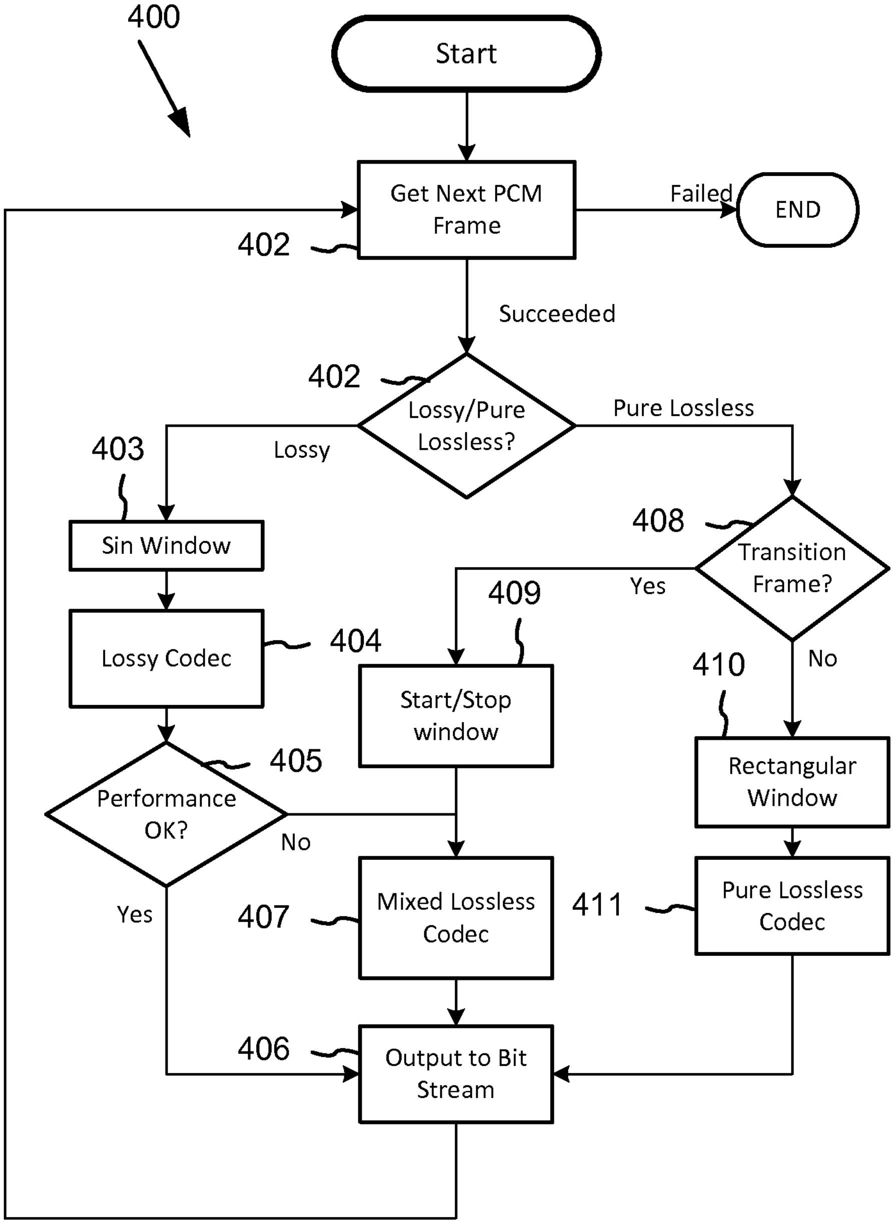
FIG. 4 is a flowchart of a process for selecting to encode an input audio signal as a lossy, mixed lossless or pure lossless frame in the unified lossy and lossless compression embodiment.

FIG. 4 illustrates a process 400 of encoding an input audio signal in the unified lossy and lossless compression embodiment. The process 400 processes the input audio signal frames (of the pulse code modulated (PCM) format frame size) frame-by-frame. The process 400 begins at action 401 by getting a next PCM frame of the input audio signal. For this next PCM frame, the process 400 first checks at action 402 whether the encoder user has selected the frame for lossy or lossless compression. If lossy compression was chosen for the frame, the process 400 proceeds to encode the input PCM frame using lossy compression with the usual transform window (which may overlap the prior frame as in the case of MDCT transform-based lossy compression), as indicated at actions 403-404. After lossy compression, the process 400 checks the compression performance of the lossy compression on the frame at action 405. The criteria for satisfactory performance can be that the resulting compressed frame is less than ¾ of the original PCM frame size, but alternatively higher or lower criteria for acceptable lossy compression performance can be used. If the lossy compression performance is acceptable, the process 400 outputs the bits resulting from the lossy compression of the frame to the compressed audio signal bit stream at action 406.

Otherwise, if the compression achieved on the frame using lossy compression is poor at action 405, the process 400 compresses the current frame as an isolated mixed lossless frame using mixed lossless compression (detailed below) at action 407. At action 406, the process 400 outputs the frame as compressed using the better performing of the lossy compression or mixed lossless compression. In actuality, although herein termed an "isolated" mixed lossless frame, the process 400 can compress multiple consecutive input frames that have poor lossy compression performance using mixed lossless compression via the path through actions 405 and 407. The frames are termed "isolated" because usually poor lossy compression performance is an isolated occurrence in the input audio stream as illustrated for the isolated mixed lossless frame 320 in the example audio signal in FIG. 3.

On the other hand, if the encoder's user was determined at the action 402 to have chosen lossless compression for the frame, the process 400 next checks whether the frame is the transition frame between lossy and lossless compression (i.e., the first or last frame in a set of consecutive frames to be encoded with lossless compression) at action 408. If it is the transition frame, the process 400 encodes the frame as a transition mixed lossless frame using mixed lossless compression at 407 with a start/stop window 409 for the frame as detailed below and outputs the resulting transition mixed lossless frame at action 406. Otherwise, if not the first or last of consecutive lossless compression frames, the process 400 encodes using lossless compression with a rectangular window at actions 410-411 and outputs the frame as a pure lossless frame at action 406.

The process 400 then returns to getting the next PCM frame of the input audio signal at action 401, and repeats until the audio signal ends (or other failure condition in getting a next PCM frame).

The presently described unified lossy and lossless compression embodiment uses modulated discrete cosine transform (MDCT)-based lossy coding for the lossy compression of lossy frames, which may be the MDCT-based lossy coding used with the Microsoft Windows Media Audio (WMA) format or other MDCT-based lossy coding. In alternative embodiments, lossy coding based on other lapped transforms or on non-overlapping transforms can be used. For more details on MDCT-based lossy coding, see, Seymour Shlien, "The Modulated Lapped Transform, Its Time-Varying Forms, and Its Application to Audio Coding Standards," IEEE Transactions On Speech and Audio Processing, Vol. 5, No. 4, July 1997, pp. 359-366.

Figure 5:
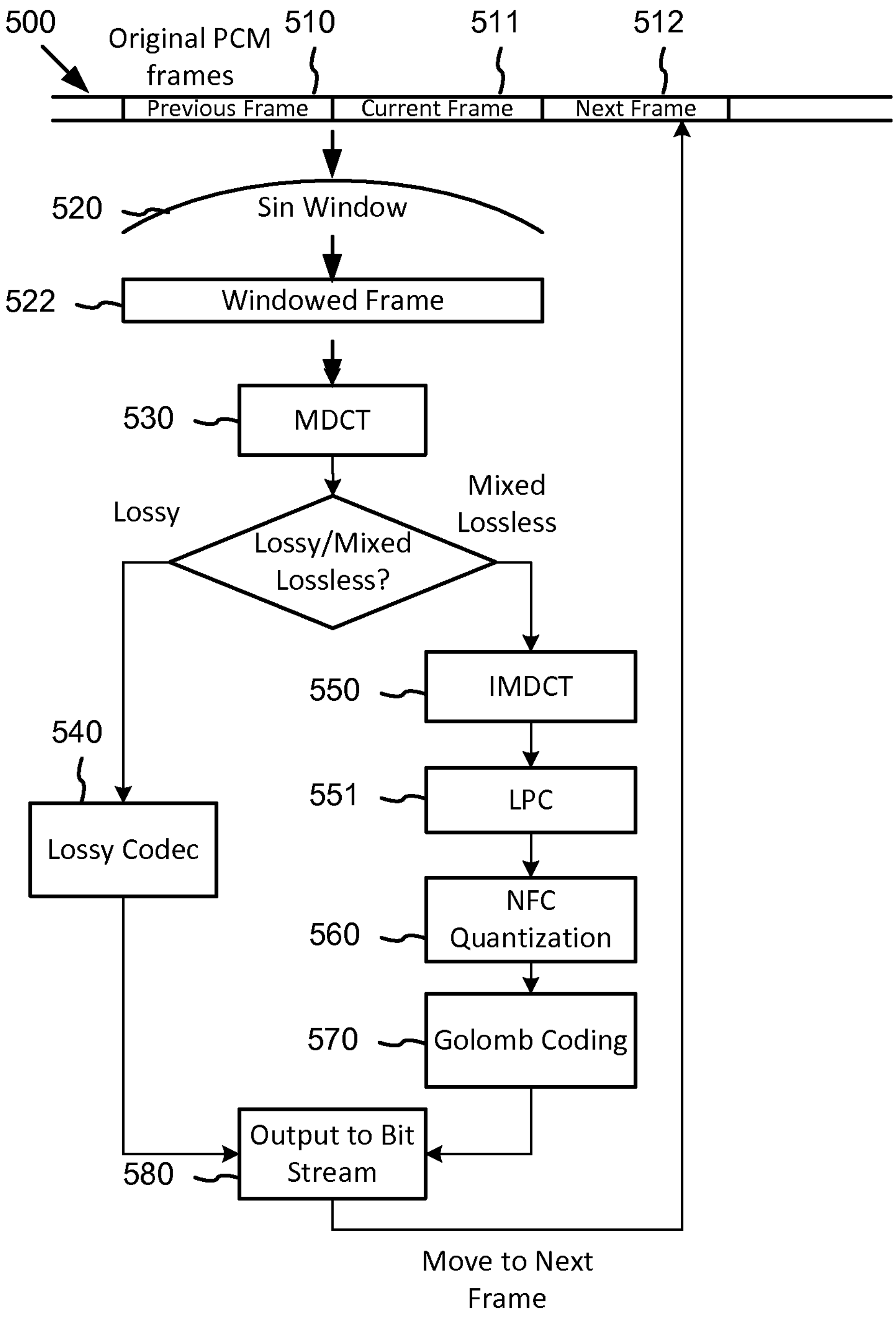
FIG. 5 is a data flow diagram illustrating mixed lossless compression of a mixed lossless frame in the unified lossy and lossless compression embodiment of FIG. 4.

With reference now to FIG. 5, the mixed lossless compression in the presently described unified lossy and lossless compression embodiment also is based on the MDCT transform. In alternative embodiments, the mixed lossless compression also preferably uses the same transform and transform window as the lossy compression employed in the respective embodiment. This approach permits the mixed lossless frames to provide a seamless transition from the lossy frames based on an overlapping window transform, and pure lossless frames which do not overlap.

For example, with the MDCT transform-based coding used in the described embodiment, the MDCT transform is applied on a windowed frame 522 derived from "sin"-based windowing function 520 of the last 2N samples of the audio signal in order to encode the next N samples of the current PCM frame 511. In other words, when encoding a current PCM frame 511 in the input audio signal, the MDCT transform is applied to a windowed frame 522 that encompasses the previous PCM frame 510 and current PCM frame 511 of the input audio signal 500. This provides a 50% overlap between consecutive windowed frames for smoother lossy coding. The MDCT transform has the property of archiving critical sampling, namely only N samples of the output are needed for perfect reconstruction when they are used in conjunction with adjacent frames.

In both lossy compression at action 404 and mixed lossless compression at action 407 in the encoding process 400 of FIG. 4, the MDCT transform 530 is applied to the windowed frame 522 derived from the previous and current PCM frames 510 and 511. For lossy compression, the encoding of the current frame 511 proceeds in the MDCT-based lossy codec 540.

Figure 6:
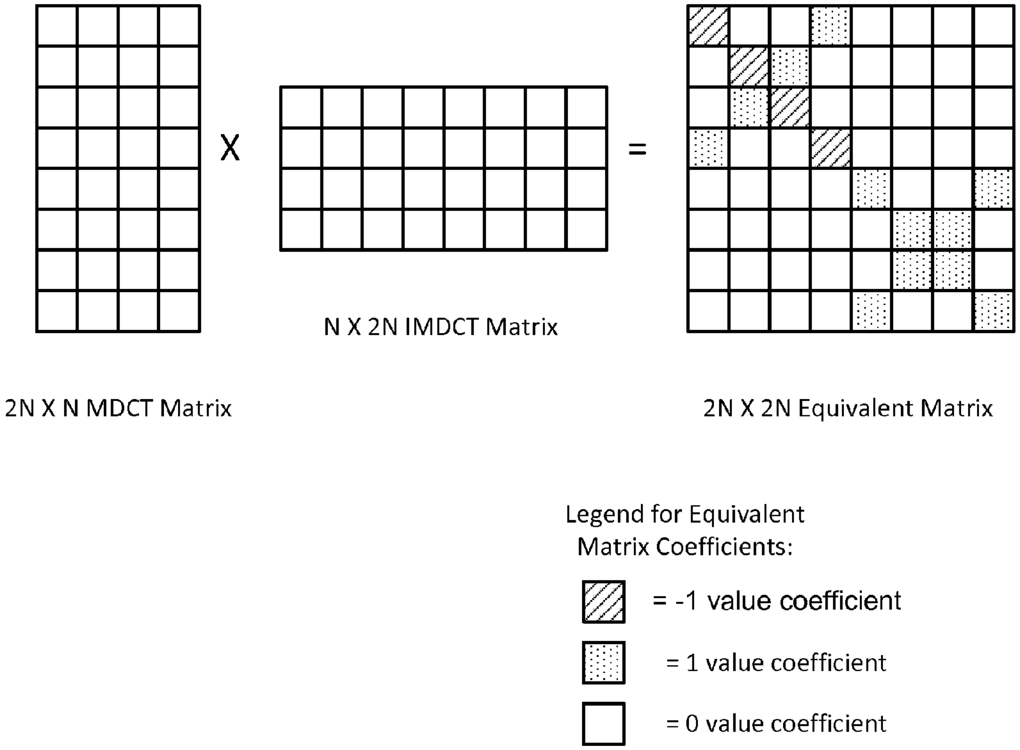
FIG. 6 is a diagram of an equivalent processing matrix for computing the modulated discrete cosine transform and its inverse together within the mixed lossless compression process of FIG. 5

For mixed lossless compression coding, the transform coefficients produced from the MDCT 530 are next input to an inverse MDCT (IMDCT) transform 550 (which in traditional MDCT-based lossy coding is otherwise done at the decoder). Since both MDCT and inverse MDCT transform are done at the encoder for mixed lossless compression, a processing equivalent of the combined MDCT and inverse MDCT can be performed in place of physically carrying out the actual transform and its inverse. More specifically, the processing equivalent can produce the same result of the MDCT and inverse MDCT as an addition of the mirroring samples in the second half of the windowed frame 522 and subtraction of the mirroring samples in the first half of the windowed frame. FIG. 6 illustrates an MDCT×IMDCT-equivalent matrix 600 for performing the processing equivalent of the MDCT×IMDCT transform as matrix multiplication with the windowed frame. The results of the MDCT and IMDCT transforms is neither in a frequency domain representation of the audio signal nor the original time domain version. The output of the MDCT and IMDCT has 2N samples but only half of them (N samples) have independent values. Therefore, the property of archiving critical sampling is preserved in the mixed lossless frames. These N samples can be designated as a "pseudo-time domain" signal because it is time signal windowed and folded. This pseudo-time domain signal preserves much of the characteristics of the original time domain audio signal, so that any time domain-based compression can be used for its coding.

In the described unified lossy and lossless compression embodiment, the pseudo-time domain signal version of the mixed lossless frame after the MDCT×IMDCT operation is coded using linear predictive coding (LPC) with a first order LPC filter 551. Alternative embodiments can encode the pseudo-time domain signal for the mixed lossless frame using other forms of time domain-based coding. For further details of LPC coding, see, John Makhoul, "Linear Prediction: A Tutorial Review," Proceedings of the IEEE, Vol. 63, No. 4, April 1975, pp. 562-580 [hereafter Makhoul]. For LPC coding, the described embodiment performs the following processing actions:

1) Compute autocorrelation. Since a simple $1^{st}$ order LPC filter is used in the described embodiment, we only need to compute R(0) and R(1) as in the following equation from Makhoul:

$$R(i) = \sum_{n=0}^{N-1-i} s'_n s'_{n+i}$$

2) Compute LPC filter coefficients. The LPC filter has only one coefficient which is R(1)/R(0).

3) Quantize filter. The LPC filter coefficient is quantized by a step size of 1/256 therefore it can be represented by 8 bits in bit stream.

4) Compute prediction residue. With the LPC filter coefficient available, we apply the LPC filter on the pseudo-time signal from MDCT and IMDCT. The output signal is the prediction residue (difference of the actual N pseudo-time domain signal samples after the MDCT and IMDCT transforms from their predicted values) which is compressed by entropy coding in the action (6) below. On the decoder side, the pseudo-time signal can be perfectly reconstructed from the residues, if noise shaping quantization is not enabled.

5) Noise shaping quantization 560. The described unified lossy and lossless compression embodiment includes a noise shaping quantization (which can be optionally disabled), such as described by N. S. Jayant and Peter Noll, "Digital Coding of Waveforms," Prentice Hall, 1984. A noise shaping quantization processing is added here to support wider quality and bit rate range and enable mixed lossless mode to do noise shaping. The merit of the noise shaping quantization is it is transparent in the decoder side.

6) Entropy coding. The described embodiment uses standard Golomb coding 570 for entropy coding of the LPC prediction residues. Alternative embodiments can use other forms of entropy coding on the LPC prediction residues for further compressing the mixed lossless frame. The Golomb coded residues are output to the compressed audio stream at output 580.

After mixed lossless compression of the current frame, the encoding process proceeds with the coding the next frame 512—which may be coded as a lossy frame, pure lossless frame or again as a mixed lossless frame.

The above described mixed lossless compression may be lossy only with respect to the initial windowing process (with noise shaping quantization disabled), hence the terminology of "mixed lossless compression."

Figure 7:
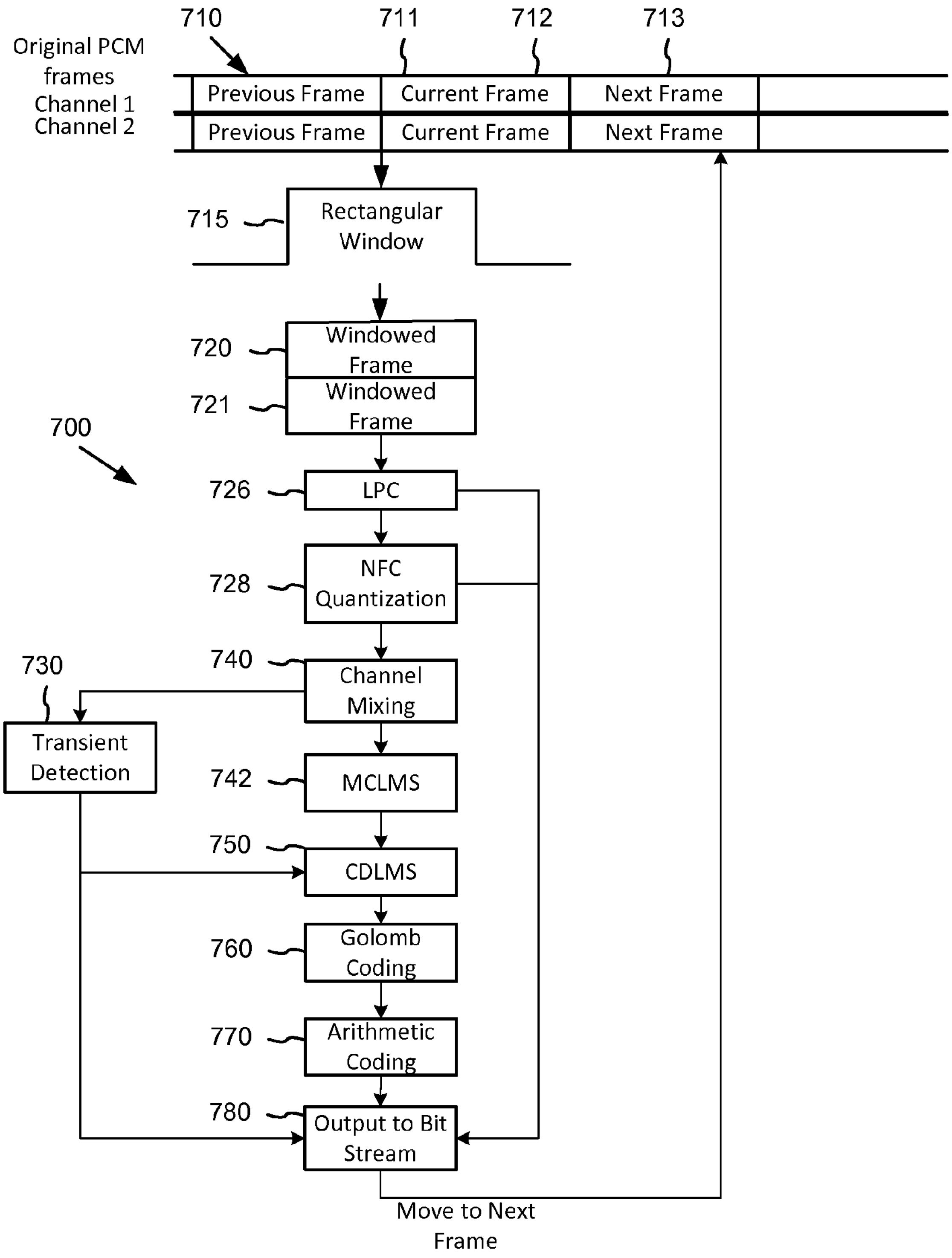
FIG. 7 is a data flow diagram illustrating pure lossless compression of a pure lossless frame in the unified lossy and lossless compression embodiment of FIG. 4.
Figure 11:
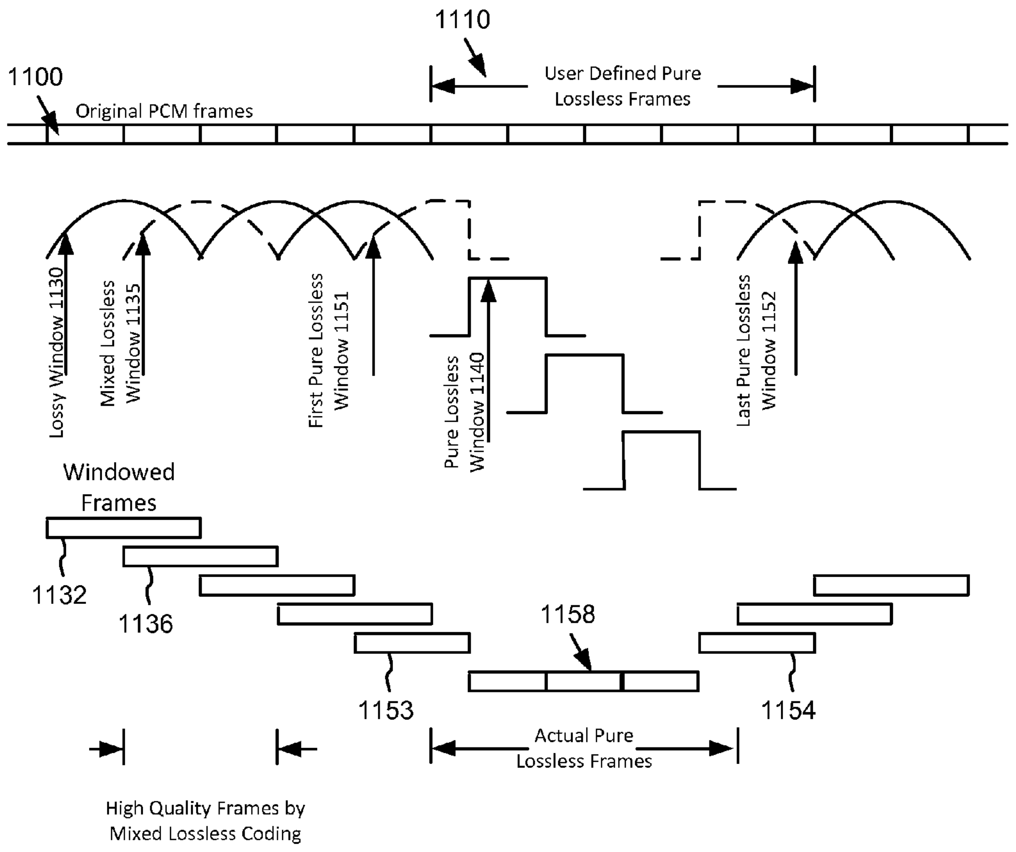
FIG. 11 is a graph showing windowing and windowed frames for a sequence of input audio frames, including a subsequence designated for lossless coding.

FIG. 7 illustrates the lossless coding 700 of a pure lossless frame in the encoding process 400 (FIG. 4) of the presently described unified lossy and lossless compression embodiment. In this example, the input audio signal is a two channel (e.g., stereo) audio signal 710. The lossless coding 700 is performed on a windowed frame 720-721 of audio signal channel samples resulting as a rectangular windowing function 715 of the previous and current PCM frames 711-712 of the input audio signal channels. After the rectangular window, the windowed frame still consists of original PCM samples. Then the pure lossless compression can be applied on them directly. The first and the last pure lossless frames have different special windows which will be described below in connection with FIG. 11.

The pure lossless coding 700 starts with a LPC filter 726 and an optional Noise Shaping Quantization 728, which serve the same purpose as components 551 and 560 in FIG. 5. Certainly, when the Noise Shaping Quantization 728 is used, the compression actually is not purely lossless anymore. But, the term "pure lossless coding" is retained herein even with the optional Noise Shaping Quantization 728 for the sake of simplicity. In the pure lossless mode, besides the LPC filter 726, there are MCLMS 742 and CDLMS 750 filters (will be described later). The Noise Shaping Quantization 728 is applied after the LPC filter 726 but before the MCLMS 742 and CDLMS 750 filters. The MCLMS 742 and CDLMS 750 filters can not be applied before the Noise Shaping Quantization 728 because they are not guaranteed to be stable filters.

The next part of the pure lossless coding 700 is transient detection 730. A transient is a point in the audio signal where the audio signal characteristics change significantly.

Figure 8:
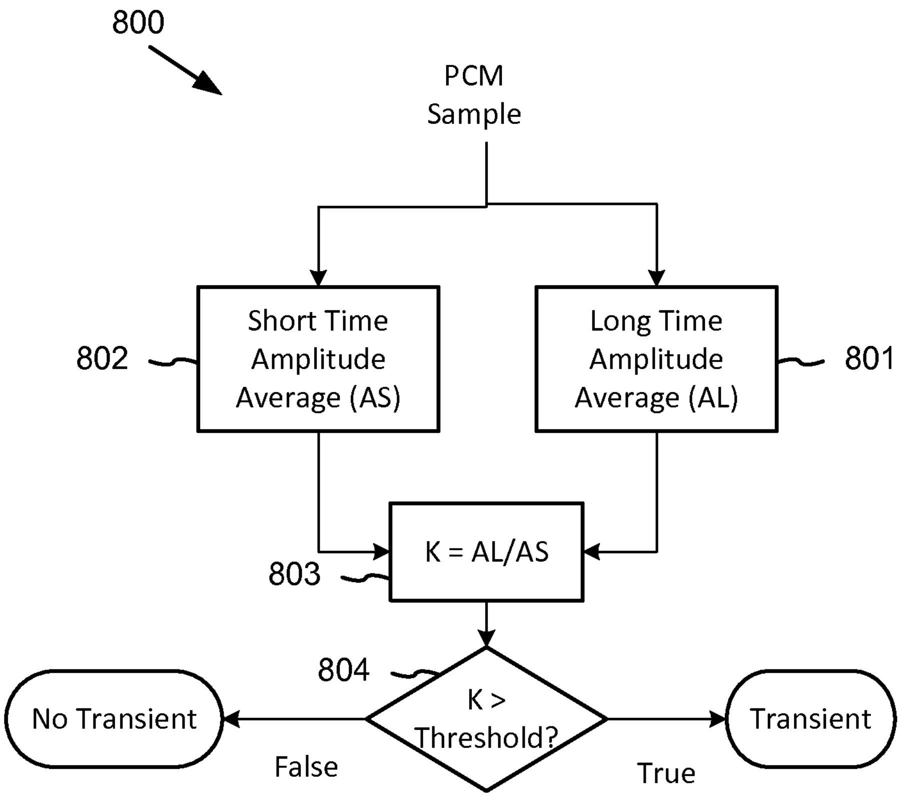
FIG. 8 is a flowchart of transient detection in the pure lossless compression of FIG. 7.

FIG. 8 shows a transient detection procedure 800 used in the pure lossless coding 700 in the presently described unified lossy and lossless compression embodiment. Alternatively, other procedures for transient detection can be used. For transient detection, the procedure 800 calculates a long term exponentially weighted average (AL) 801 and short term exponentially weighted average (AS) 802 of previous samples of the input audio signal. In this embodiment, the equivalent length for the short term average is 32, and the long term average is 1024; although other lengths can be used. The procedure 800 then calculates a ratio (K) 803 of the long term to short term averages, and compares the ratio to a transient threshold (e.g., the value 8) 804. A transient is considered detected when the ratio exceeds this threshold.

After transient detection, the pure lossless coding 700 performs an inter-channel de-correlation block 740 to remove redundancy among the channels. This consists of a simple S-transformation and a multi-channel least mean square filter (MCLMS) 742. The MCLMS varies in two features from a standard LMS filter. First, the MCLMS uses previous samples from all channels as reference samples to predict the current sample in one channel. Second, the MCLMS also uses some current samples from other channels as reference to predict the current sample in one channel.

Figure 9:
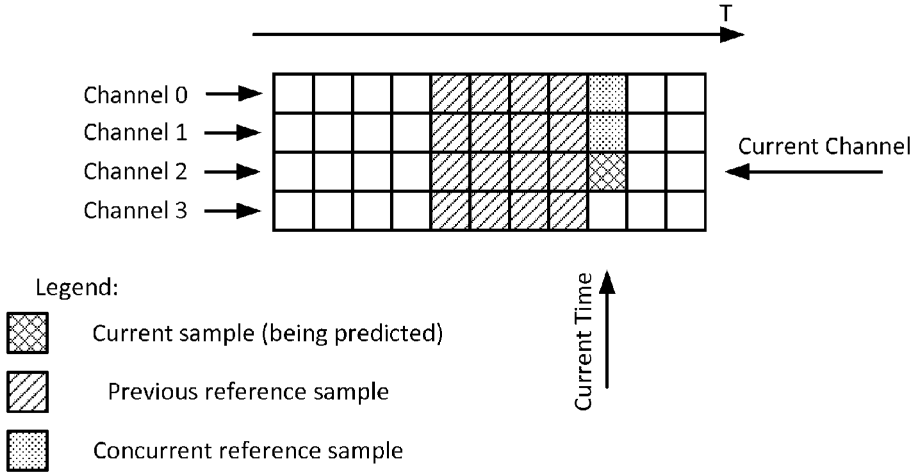
FIG. 9 is a graph showing references samples used for a multi-channel least means square predictive filter in the pure lossless compression of FIG. 7.

For example, FIG. 9 depicts the reference samples used in MCLMS for a four channel audio input signal. In this example four previous samples in each channel as well as the current sample in preceding other channels are used as reference samples for the MCLMS. The predicted value of the current sample of the current channel is calculated as a dot product of the values of the reference samples and the adaptive filter coefficients associated with those samples. After the prediction, the MCLMS uses the prediction error to update the filter coefficients. In this four channel example, the MCLMS filter for each channel has a different length, with channel 0 having the shortest filter length (i.e., 16 reference samples/coefficients) and channel 3 having the longest (i.e., 19).

Figure 10:
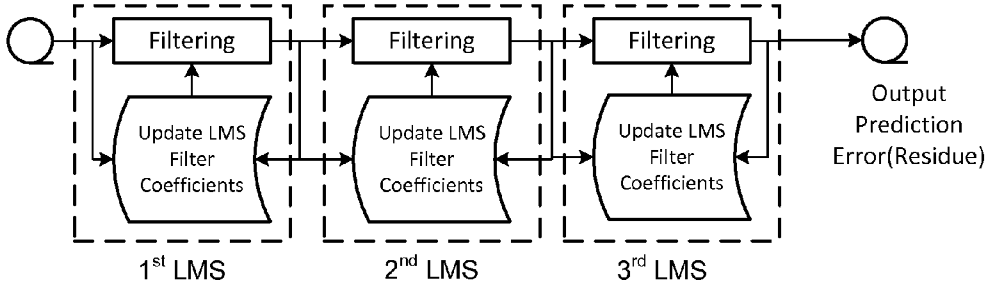
FIG. 10 is a data flow diagram showing the arrangement and data flow through a cascaded LMS filter in the pure lossless compression of FIG. 7.

Following the MCLMS, the pure lossless coding applies a set of cascaded least mean square (CDLMS) filters 750 on each channel. The LMS filter is an adaptive filter technique, which does not use future knowledge of the signal being processed. The LMS filter has two parts, prediction and updating. As a new sample is coded, the LMS filter technique uses the current filter coefficients to predict the value of the sample. The filter coefficients are then updated based on the prediction error. This adaptive characteristic makes the LMS filter a good candidate to process time varying signals like audio. The cascading of several LMS filters also can improve the prediction performance. In the illustrated pure lossless compression 700, the LMS filters are arranged in a three filter cascade as shown in FIG. 10, with the input of a next filter in the cascade connecting to the output of the previous filter. The output of the third filter is the final prediction error or residue. For more details of LMS filters, see, Simon Haykin, "Adaptive Filter Theory," Prentice Hall, 2002; Paolo Prandoni and Martin Vetterli, "An FIR Cascade Structure for Adaptive Linear Prediction," IEEE Transactions On Signal Processing, Vol. 46, No. 9, September 1998, pp. 2566-2571; and Gerald Schuller, Bin Yu, Dawei Huang, and Bern Edler, "Perceptual Audio Coding Using Pre- and Post-Filters and Lossless Compression," to appear in IEEE Transactions On Speech and Audio Processing.

With reference again to FIG. 7, the lossless coding 700 uses the transient detection 730 result to control the updating speed of the CDLMS 750. As just described, the LMS filter is adaptive filter whose filter coefficients update after each prediction. In the lossless compression, this helps the filter track changes to the audio signal characteristics. For optimal performance, the updating speed should be able to follow the signal changing and avoid oscillation at the same time. Usually, the signal changes slowly so the updating speed of the LMS filter is very small, such as 2^(−12) per sample. But, when significant changing occurs in music such as a transient from one sound to another sound, the filter updating can fall behind. The lossless coding 700 uses transient detection to facilitate the filter adapting to catch up with quickly changing signal characteristic. When the transient detection 730 detects a transient in the input, the lossless coding 700 doubles the updating speed of the CDLMS 750.

After the CDLMS 750, the lossless coding 700 employs an improved Golomb coder 760 to encode the prediction residue of the current audio signal sample. The Golomb coder is improved in that it uses a divisor that is not a power of 2. Instead, the improved Golomb coder uses the relation, 4/3*mean(abs(prediction residue)). Because the divisor is not a power of 2, the resulting quotient and remainder are encoded using arithmetic coding 770 before being output 780 to the compressed audio stream. The arithmetic coding employs a probability table for the quotients, but assumes a uniform distribution in the value of the remainders.

Figure 12:
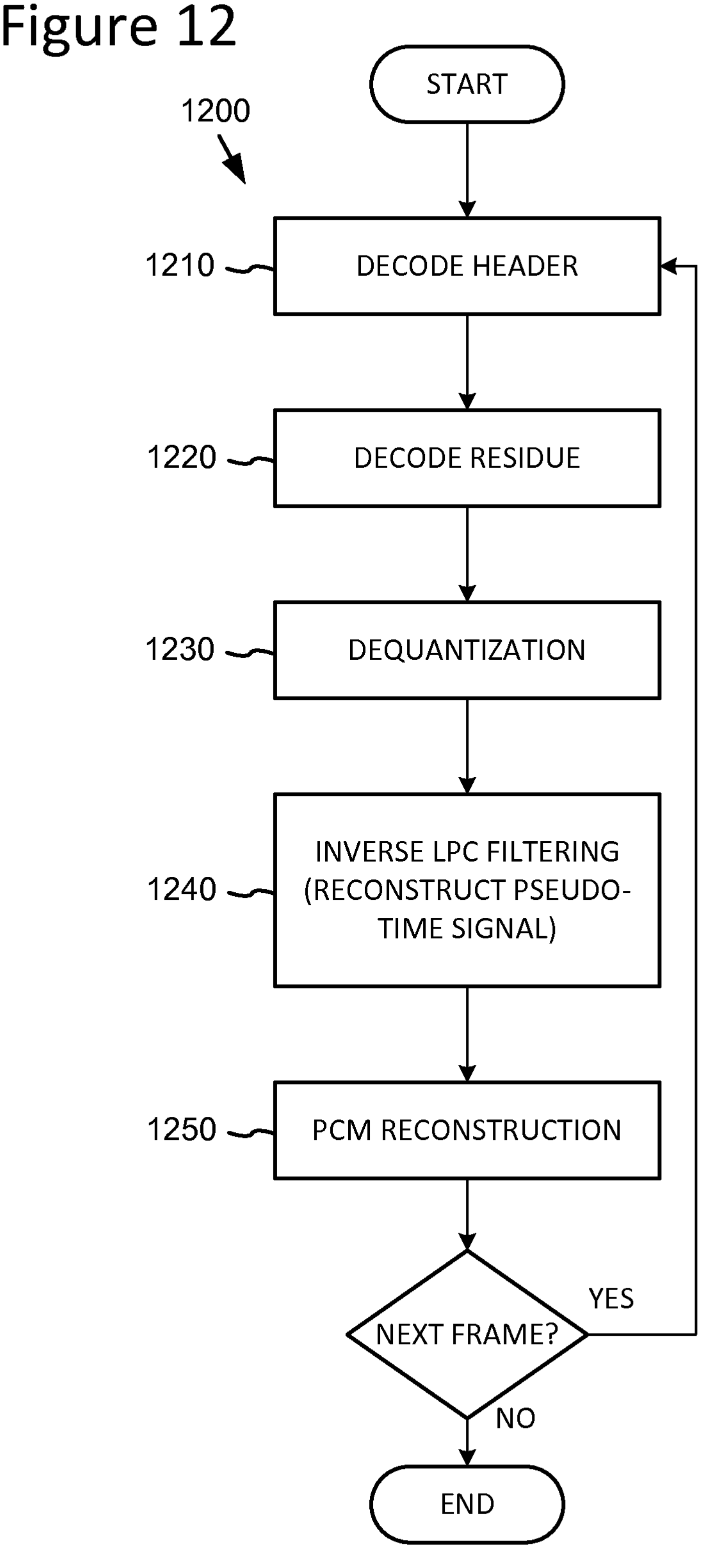
FIG. 12 is a flowchart showing decoding of a mixed lossless frame.

FIG. 12 depicts the windowing functions applied to original PCM frames of the input audio signal to produce the windowed coding frames for lossy, mixed lossless and pure lossless coding. In this example, the encoder's user has designated a subsequence 1110 of the original PCM frames of the input audio signal 1100 as lossless frames to be encoded with pure lossless coding. As discussed in connection with FIG. 5, lossy coding in the presently described unified lossy and lossless compression embodiment applies a sin window 1130 to the current and previous PCM frames to produce the windowed lossy coding frame 1132 that is input to the lossy encoder. The mixed lossless coding of isolated mixed lossless coding frame 1136 also uses the sin-shape window 1135. On the other hand, the pure lossless coder uses a rectangular windowing function 1140. The mixed lossless coding for transition between lossy and lossless coding (at first and last frames of the subsequence 1110 designated for pure lossless coding) effectively combines the sine and rectangular windowing functions into first/last transition windows 1151, 1152 to provide transition coding frames 1153, 1154 for mixed lossless coding, which bracket the pure lossless coding frames 1158. Thus, for the subsequence 1110 of frames (numbered s through e) designated by the user for lossless coding, the unified lossy and lossless compression embodiment encodes frames (s through e−1) using lossless coding, and frame e as mixed lossless. Such a windowing functions design guarantees that each frame has the property of archiving critical sampling, meaning no redundant information is encoded and no sample is lost when the encoder changes among lossy, mixed lossless, and pure lossless frames. Therefore, seamlessly unifying lossy and lossless encoding of an audio signal is realized.

FIG. 12 depicts the decoding 1200 of a mixed lossless frame in the presently described unified lossy and lossless compression embodiment. The decoding of a mixed lossless frame begins at action 1210 with decoding the header of the mixed lossless frame. In the presently described unified lossy and lossless compression embodiment, headers for mixed lossless frames have their own format which is much simpler than that of lossy frames. The mixed lossless frame header stores information of the LPC filter coefficients and the quantization step size of the noise shaping.

Next in the mixed lossless decoding, the decoder decodes each channel's LPC prediction residues at action 1220. As described above, these residues are encoded with Golomb coding 570 (FIG. 5), and require decoding the Golomb codes.

At action 1230, the mixed lossless decoder inverses the noise shaping quantization, simply multiplying the decoded residues by the quantization step size.

At action 1240, the mixed lossless decoder reconstructs the pseudo-time signal from the residues, as an inverse LPC filtering process.

At action 1250, the mixed lossless decoder performs PCM reconstruction of the time domain audio signal. Because the "pseudo-time signal" is already the result of the MDCT and IMDCT, the decoder at this point operates as with decoding lossy compression decoding to invert the frame overlapping and windowing.

Figure 13:
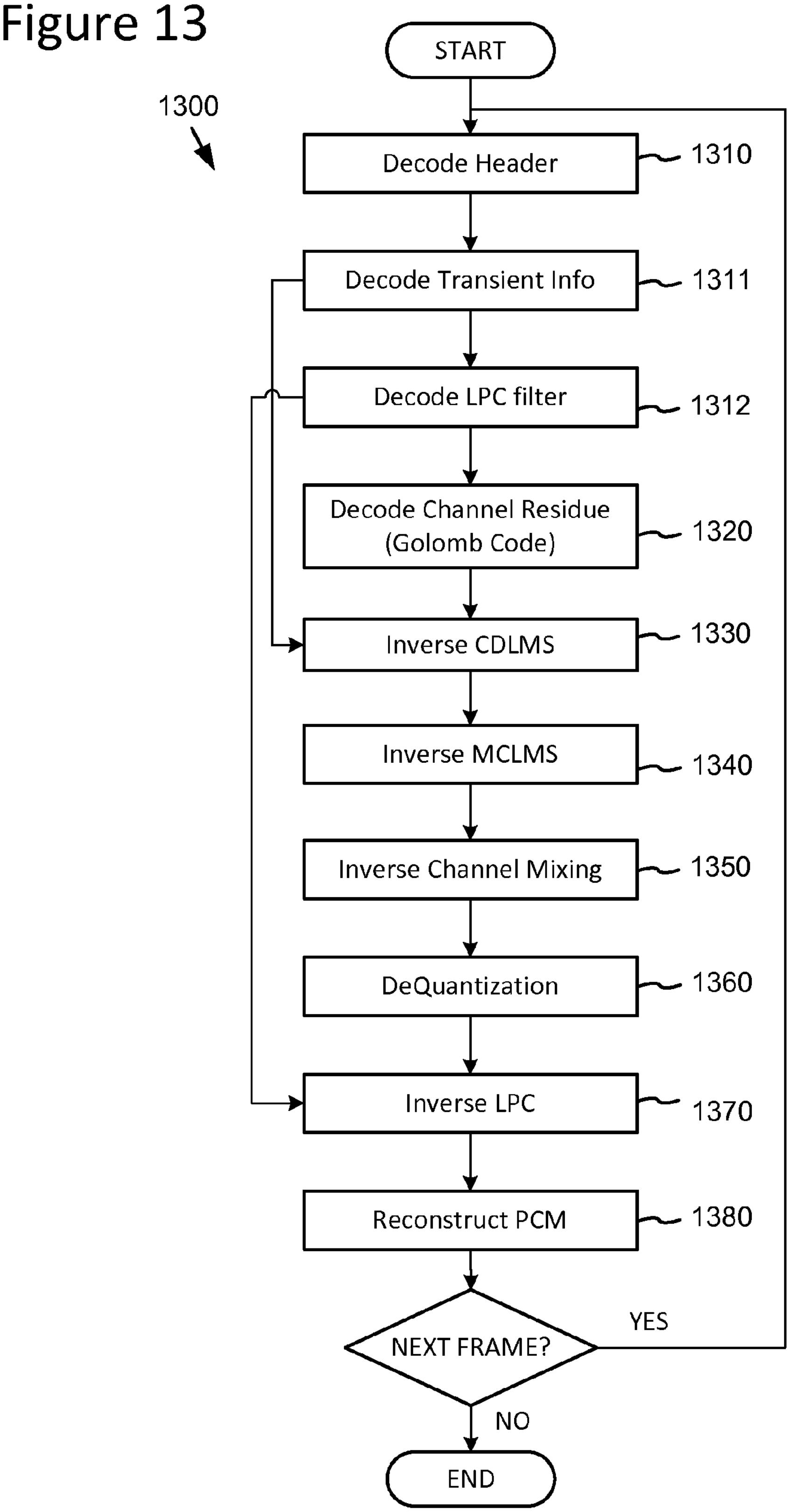
FIG. 13 is a flowchart showing decoding of a pure lossless frame.

FIG. 13 depicts decoding 1300 of pure lossless frames at the audio decoder. The pure lossless frame decoding again begins with decoding the frame header, as well as transient information and LPC filter at action 1310-12. The pure lossless frame decoder then proceeds to reverse the pure lossless coding process, by decoding 1320 the Golomb codes of the prediction residues, inverse CDLMS filtering 1330, inverse MCLMS filtering 1340, inverse channel mixing 1350, dequantization 1360, and inverse LPC filtering 1370. Finally, the pure lossless frame decoder reconstructs the PCM frame of the audio signal at action 1380.

III. Computing Environment

The above described audio processor and processing techniques for unified lossy and lossless audio compression can be performed on any of a variety of devices in which digital audio signal processing is performed, including among other examples, computers; audio recording, transmission and receiving equipment; portable music players; telephony devices; and etc. The audio processor and processing techniques can be implemented in hardware circuitry, as well as in audio processing software executing within a computer or other computing environment, such as shown in FIG. 14.

Figure 14:
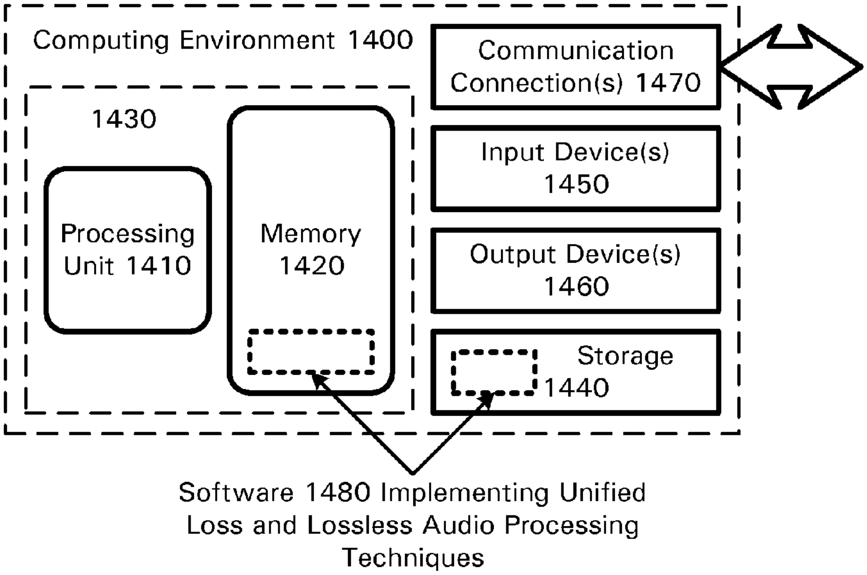
FIG. 14 is a block diagram of a suitable computing environment for the unified lossy and lossless compression embodiment of FIG. 4.

FIG. 14 illustrates a generalized example of a suitable computing environment (1400) in which described embodiments may be implemented. The computing environment (1400) is not intended to suggest any limitation as to scope of use or functionality of the invention, as the present invention may be implemented in diverse general-purpose or special-purpose computing environments.

With reference to FIG. 14, the computing environment (1400) includes at least one processing unit (1410) and memory (1420). In FIG. 14, this most basic configuration (1430) is included within a dashed line. The processing unit (1410) executes computer-executable instructions and may be a real or a virtual processor. In a multi-processing system, multiple processing units execute computer-executable instructions to increase processing power. The memory (1420) may be volatile memory (e.g., registers, cache, RAM), non-volatile memory (e.g., ROM, EEPROM, flash memory, etc.), or some combination of the two. The memory (1420) stores software (1480) implementing an audio encoder that generates and compresses quantization matrices.

A computing environment may have additional features. For example, the computing environment (1400) includes storage (1440), one or more input devices (1450), one or more output devices (1460), and one or more communication connections (1470). An interconnection mechanism (not shown) such as a bus, controller, or network interconnects the components of the computing environment (1400). Typically, operating system software (not shown) provides an operating environment for other software executing in the computing environment (1400), and coordinates activities of the components of the computing environment (1400).

The storage (1440) may be removable or non-removable, and includes magnetic disks, magnetic tapes or cassettes, CD-ROMs, CD-RWs, DVDs, or any other medium which can be used to store information and which can be accessed within the computing environment (1400). The storage (1440) stores instructions for the software (1480) implementing the audio encoder that that generates and compresses quantization matrices.

The input device(s) (1450) may be a touch input device such as a keyboard, mouse, pen, or trackball, a voice input device, a scanning device, or another device that provides input to the computing environment (1400). For audio, the input device(s) (1450) may be a sound card or similar device that accepts audio input in analog or digital form, or a CD-ROM reader that provides audio samples to the computing environment. The output device(s) (1460) may be a display, printer, speaker, CD-writer, or another device that provides output from the computing environment (1400).

The communication connection(s) (1470) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The audio processing techniques herein can be described in the general context of computer-readable media. Computer-readable media are any available media that can be accessed within a computing environment. By way of example, and not limitation, with the computing environment (1400), computer-readable media include memory (1420), storage (1440), communication media, and combinations of any of the above.

The audio processing techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

While the audio processing techniques are described in places herein as part of a single, integrated system, the techniques can be applied separately, potentially in combination with other techniques. In alternative embodiments, an audio processing tool other than an encoder or decoder implements one or more of the techniques.

The described audio encoder and decoder embodiments perform various techniques. Although the operations for these techniques are typically described in a particular, sequential order for the sake of presentation, it should be understood that this manner of description encompasses minor rearrangements in the order of operations, unless a particular ordering is required. For example, operations described sequentially may in some cases be rearranged or performed concurrently. Moreover, for the sake of simplicity, flowcharts typically do not show the various ways in which particular techniques can be used in conjunction with other techniques.

In view of the many possible embodiments to which the principles of our invention may be applied, we claim as our invention all such embodiments as may come within the scope and spirit of the following claims and equivalents thereto.

We claim:

1. In an audio decoder, a method comprising:

receiving at the audio decoder, first encoded audio information and second encoded audio information in a bit stream for audio in multiple channels, the first and second audio information having been encoded based on an MDCT of input audio data, wherein the first encoded audio information is further based on plural lossy mode coding processes that include perceptual weighting and entropy coding, and the second encoded audio information is further based on plural lossless mode coding processes that include an inverse MDCT and Golomb coding; and with the audio decoder, decoding at least one of the first encoded audio information and the second encoded audio information, wherein the second encoded audio information is decoded with plural decoding processes that include Golomb decoding and arithmetic decoding.

2. The method of claim 1, further comprising outputting decoded audio information.

3. The method of claim 1, wherein the decoding of at least the second audio information includes inverse noise shaping.

4. The method of claim 1, wherein the Golomb decoding and the arithmetic decoding applied to the second audio information decode residual values to be combined with prediction values.

5. The method of claim 1, wherein the plural lossy mode coding processes associated with the first audio information comprises non-rectangular windowing.

6. The method of claim 5, wherein the non-rectangular windowing is based on a sine windowing function.

7. The method of claim 1, wherein the decoding of the second audio information further comprises inverting noise shaping quantization.

8. The method of claim 1, further comprising reconstructing a pulse code modulated frame based on at least one of the decoded first encoded audio information and the decoded second encoded audio information.

9. An audio processor, comprising:

an input configured to receive first encoded audio information and second encoded audio information in a bit stream for audio in multiple channels, the first and second audio information having been encoded based on an MDCT of input audio data, wherein the first encoded audio information is further based on plural lossy mode coding processes that include perceptual weighting and entropy coding, and the second encoded audio information is further based on plural lossless mode coding processes that include an inverse MDCT and Golomb coding; and an audio decoder configured to decode at least one of the first encoded audio information and the second encoded information, wherein the audio decoder is configured to decode the second encoded information with plural decoding processes that include Golomb decoding and arithmetic decoding.

10. The audio processor of claim 9, further comprising an output configured to receive reconstructed audio from the audio decoder.

11. The audio processor of claim 9, wherein the Golomb decoding and the arithmetic decoding applied to the second audio information decode residual values and combine residual values with prediction values.

12. The audio processor of claim 9, wherein the plural lossy mode coding processes associated with the first audio information comprises non-rectangular windowing.

13. The audio processor of claim 12, wherein the non-rectangular windowing is based on a sine windowing function.

14. The audio processor of claim 9, wherein the audio decoder is configured to invert noise shaping quantization associated with the second audio information.

15. The audio processor of claim 9, wherein the audio decoder is configured to reconstruct a pulse code modulated frame based on at least one of the decoded first encoded audio information and the decoded second encoded audio information.

16. A computer-readable storage medium having computer-executable instructions thereon for executing on a computing device to effect an audio decoding method, the method comprising:

receiving first encoded audio information and second encoded audio information in a bit stream for audio in multiple channels, the first and second audio information having been encoded based on an MDCT of input audio data, wherein the first encoded audio information is further based on plural lossy mode coding processes that include perceptual weighting and entropy coding, and the second encoded audio information is further based on plural lossless mode coding processes that include an inverse MDCT and Golomb coding; and decoding at least one of the first encoded audio information and the second encoded audio information, wherein the second encoded audio information is decoded with plural decoding processes that include Golomb decoding and arithmetic decoding.

17. The computer-readable storage medium of claim 16, further comprising computer-executable instructions for outputting decoded audio information based on at least one of the first encoded audio information and the second encoded audio information.

18. The computer-readable storage medium of claim 17, further comprising computer-executable instructions for reconstructing a pulse code modulated frame based on at least one of the decoded first encoded audio information and the decoded second encoded audio information.

* * * * *